United States Patent [19]

Murmann et al.

[11] Patent Number: 5,612,691
[45] Date of Patent: Mar. 18, 1997

[54] ERGONOMIC KEYBOARD

[75] Inventors: Günter Murmann, Pegnitz; Manfred Frank, Cadolzburg, both of Germany

[73] Assignee: Cherry Mikroschalter GmbH, Auerbach, Germany

[21] Appl. No.: 397,472

[22] Filed: Mar. 2, 1995

[30] Foreign Application Priority Data

Mar. 11, 1994 [DE] Germany .......................... 44 08 330.0

[51] Int. Cl.$^6$ .......................... H03K 17/94; H03M 11/00
[52] U.S. Cl. .............................. 341/22; 345/168; 400/489
[58] Field of Search ........................ 341/23, 22; 345/156, 345/168; 400/489, 82

[56] References Cited

U.S. PATENT DOCUMENTS

| | | |
|---|---|---|
| 5,067,834 | 11/1991 | Szmanda et al. ........................ 400/489 |
| 5,156,475 | 10/1992 | Zilberman ............................... 400/472 |
| 5,161,760 | 11/1992 | Terbrack ............................ 345/168 X |
| 5,228,791 | 7/1993 | Fort ........................................ 400/489 |
| 5,318,367 | 6/1994 | Braun et al. ............................... 400/82 |
| 5,342,005 | 8/1994 | Szmanda et al. ................... 400/489 X |
| 5,351,066 | 9/1994 | Rucker et al. .......................... 345/168 |
| 5,361,082 | 11/1994 | Chung .................................... 345/168 |
| 5,388,921 | 2/1995 | Chung .................................... 400/472 |
| 5,393,150 | 2/1995 | Fort ........................................ 400/489 |

FOREIGN PATENT DOCUMENTS 9318500 9/1993 WIPO ..................................... 345/168

OTHER PUBLICATIONS

PC World, May 1993, "Weird Keyboards: Rx for Hands?" Key Tronic; "FlexPro"; 1993.

*Primary Examiner*—Thomas Mullen
*Assistant Examiner*—Timothy Edwards, Jr.
*Attorney, Agent, or Firm*—Klaus J. Bach

[57] ABSTRACT

In an ergonomic keyboard comprising at least two housing sections with separate key pads wherein the two housing sections are interconnected by a joint permitting pivoting and also tilting of the two housing sections relative to each other, the joint comprises a coil spring which extends between, and is connected to, the two housing sections at the end of the housing sections remote from an operator so as to form a universal joint between the two housing sections, and a sector-shaped indexing plate is mounted with one end firmly to one of the housing sections and extends into the other housing section so that it bridges any gap formed between the two housing sections when they are pivoted apart, and the other housing section has a guide pin projecting into a partial circular guide slot formed in the indexing plate and having a center of curvature coinciding with the universal joint pivoting center for guiding the two housing sections relative to each other.

12 Claims, 7 Drawing Sheets

ERGONOMIC KEYBOARD

BACKGROUND OF THE INVENTION

The present invention relates to an ergonomic keyboard, particularly an ergonomic keyboard with pivotable and tiltable housing parts which can be locked in particular positions.

Ergonomic keyboards are intended to avoid the need for the unnatural angling of the hands in order to operate the classical keyboard arrangement as used in typewriters with straight rows of keys which use rows placed at a higher elevation toward the back away from the operator and which have different stroke lengths for the finger stops because of the different finger lengths. Such keyboards are intended to avoid clenched body positions such that work with the keyboard becomes less tiring. Furthermore, the occurrence of long term injuries such as carpal tunnel syndrome and similar injuries may be avoided.

To this end, a number of proposals for more ergonomically favorable keyboard arrangements have been made. A first group of publications as represented by DE 5 777 708, DE-GM 8716224, DE-GM 88 01 303 and U.S. Pat. No. 5,119,078 suggests ergonomic keyboards with fixed arrangements of keyboard blocks, wherein the keyboard is with regard to the (essentially horizontally extending) direction of view of the operator divided into two partial fields, wherein the rows of keys are parallel to each other in each partial field and the two partial fields are pivoted about a vertical axis such that they are arranged at an angle with regard to each other so that they form a wedge-like shape pointing toward the operator.

Instead of the wedge-shaped arrangement described above, another group of ergonomic keyboards is upwardly curved in its center section. DE-GM 9207043 discloses various embodiments for rigid keyboards which are raised in their center section (in the area where, with the use of the ten finger system, the pointing fingers are used to operate the keys) and have reduced heights toward both ends (where the smaller fingers operate the keys). DE-GM 9200531 discloses a keyboard which is wedge-shaped as described earlier, and which, in contrast to the arrangement described in DE-GM 9207043, is curved such that it is higher at its outer areas where the smaller fingers operate the keys and has its lowest point in the center where the pointing fingers operate the keys.

In all these arrangements of keyboards, the unnatural angling and pivoting of the hands is omitted to some degree by the wedge-shaped arrangement and the curved shape of the keyboards so that the keyboards become ergonomically more acceptable for the user. However, since the keyboard arrangements are rigid, they cannot be adjusted to the size and personal requirements of the operator.

In further developments of the first group of ergonomic keyboards, various pivoting mechanisms have been proposed which permit the pivoting of the two keyboard halves relative to each other about a vertical axis about a certain angle range (EP-A-489,491; DE-OS4108096). They are however not height adjustable from the center (the pointing finger area) to the outside (the small finger area) so that a height adjustment of the keys is not possible and an optimum ergonomic arrangement can not be provided. Furthermore, the joint mechanisms disclosed therein are not capable of fixing the keyboard section in any of their angled positions relative to each other in a stable manner.

WO 92/0085 discloses an arrangement of keyboard sections which are disposed side-by-side and contain each a part of the whole keyboard. The keyboard sections are flat and are interconnected by joints which permit pivoting and angling of the keyboard sections relative to each other so that they can be ergonomically adjusted as desired. However, the ball joints used in the arrangement of WO 92/0085 provide only for relatively few stable position settings in which the keyboard sections can be fixed when they are pivoted and/or tilted. Further more, the ball joints oilier no possibility for the electrical connecting cables to extend across the gap formed between the keyboard section in such a way that they are well protected. Since support for the keyboard sections in their pivoted or tilted positions is obtained essentially only by means of locking of the ball joints, it is further necessary to choose relatively tight balljoints. Tight balljoints are needed to stabilize the keyboard sections in their various positions but are difficult to operate. Easily movable balljoints facilitate the adjustment of the keyboard sections but do not provide much stability. WO 92/0085 further shows that the keyboard sections when pivoted or tilted with respect to each other, are supported only on a fraction of their base surfaces such that optimal support for the keyboard is sacrificed.

It is, therefore, the object of the present invention to provide an ergonomic keyboard with key board sections which permit pivoting of the sections relative to each other about a vertical axis as well as tilting of the keyboard sections about a horizontal axis with a multitude of individually adjustable secure locking positions and which are easily operated between the locking positions. It further should provide for a joint mechanism which offers protection for the cable connections extending across the gap between the keyboard sections which are pivotable and tiltable relative to each other and which provide for firm support in each of the pivoted or tilted positions of the keyboard sections.

SUMMARY OF THE INVENTION

The ergonomic keyboard according to the invention is divided into at least two sections which are pivotable and tiltable with respect to each other. Near the pivot point, which is disposed on the separation line extending horizontally between the two adjacent keyboard pans, there is provided a joint, which, in accordance with the invention, is a coiled spring extending between the two keyboard sections normal to the separation plane and having its opposite ends connected to the adjacent housing pans so as to form a hinge. In addition to this first joint, the adjacent keyboard sections are interconnected by a pivoting guide structure consisting of an essentially circular sector-like flexible indexing plate which extends between and is connected to the two adjacent separate keyboard sections so as to bridge the separation gap between the two adjacent keyboard sections. The indexing plate is firmly mounted to one of the keyboard sections and is provided with a circular guide slot having its center of curvature at the hinge between the keyboard sections and a guide pin mounted on the other of the adjacent keyboard sections extends through the guide slot so that pivoting of the two keyboard sections about their hinge is possible. The guide slot is provided, at circumferentially spaced locations, with enlarged portions providing for indexing positions for the pin sliding in the guide slot. The spiral spring and the flexible indexing plate permit pivoting as well as tilting of the interconnected keyboard sections relative to each other but also provide for stable positioning of the interconnected keyboard sections when the indexing pin is engaged in one of the various locking positions in the indexing plate.

In an embodiment of the keyboard according to the invention, the keyboard sections have at the bottom side two groups of pivotally mounted legs of different length which can be pivoted between two end positions, (pivoted fully into the keyboard bottom or pivoted fully out so as to project therefrom) and which can be locked in their end positions by locking means. By a suitable arrangement of the different pivotable keyboard legs at the bottom of the keyboard sections and because the two groups of legs extend to different levels from the keyboard bottom when they are pivoted out of their rest position in the keyboard bottoms, the two keyboard sections can be supported in all their relative pivot positions in a mechanically stable manner. At least three different inclinations with regard to the keyboard support surface can be obtained as the spring hinge and the flexible locking plate permit relative position changes of the two keyboard sections to a large degree. This is further facilitated by the fact that the pivotable keyboard legs are provided at their rounded edges with protruding antiskid bulges which prevent skidding of the pivotable support legs on the support surface in any of the various adjustment configurations of the keyboard sections.

In addition, each of the separate keyboard sections may be provided with hand rests which may also have the groups of legs described above.

Electrical connecting cables extending between adjacent keyboard sections can be protected with the keyboard according to the invention by being received within the coil spring forming the hinge between the keyboard sections whereby they are surrounded by the spring in any of the positions of the keyboard section relative to each other.

The spacing bar is in the keyboard arrangement according to the invention the only key which is disposed on both keyboard sections and which accordingly is divided into two spacing bar halves one for each of the two keyboard sections. Each spacing bar half consists of a stationary spacing bar portion which is mounted on the respective keyboard section housing half and a slidable spacing bar portion including a locking structure retaining the slidable spacing bar portion on the respective stationary spacing bar portion. With this arrangement, the slidable spacing bar portions can be extended sideways to various locking positions with regard to the stationary spacing bar portion so that, in a pivoted position of the two keyboard sections the gap formed between the keyboard sections can be bridged by the slidable spacing bar portions.

The various features and advantages of the invention are more readily apparent from the following description of some embodiments shown, by way of example, in the accompanying drawings.

DESCRIPTION OF A PREFERRED EMBODIMENT

Figure 1:
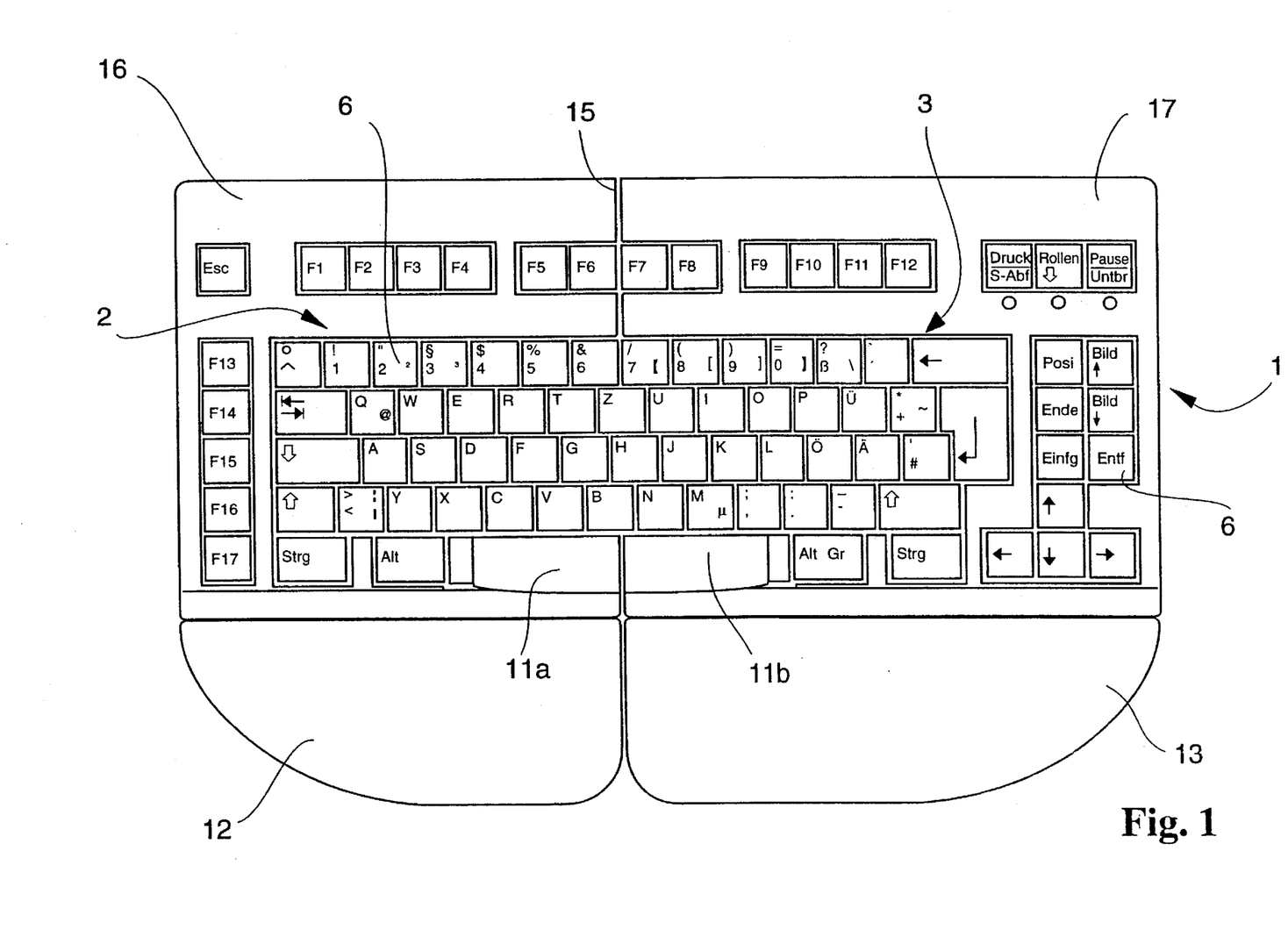
FIG. 1 is a top view of a first embodiment of the ergonomic keyboard according to the invention in a closed state.

FIG. 1 which is a top view of an embodiment of an ergonomic keyboard, shows two keyboard sections 1 and 2 which are separated along a horizontal line extending in a plane 15 essentially along the line of view of an operator and comprising the keys for the left and right hands respectively supported in housing sections 16 and 17. The right hand keyboard section comprises a larger number of keys 6 than the left hand keyboard section and the two keyboard sections have different sizes. With the exception of the spacing bar which is divided in the middle into two halves 11a, 11b all the keys are clearly assigned to one of the keyboard sections 2 or 3. In front of each of the left and right hand keyboard sections 16, 17, there is a removable hand rest 12 and 13, respectively. FIG. 1 shows the keyboard 1 in its standard configuration with keypads arranged in parallel which provides for the most compact keyboard arrangement as it would be used during transport or when the space is limited.

Figure 2:
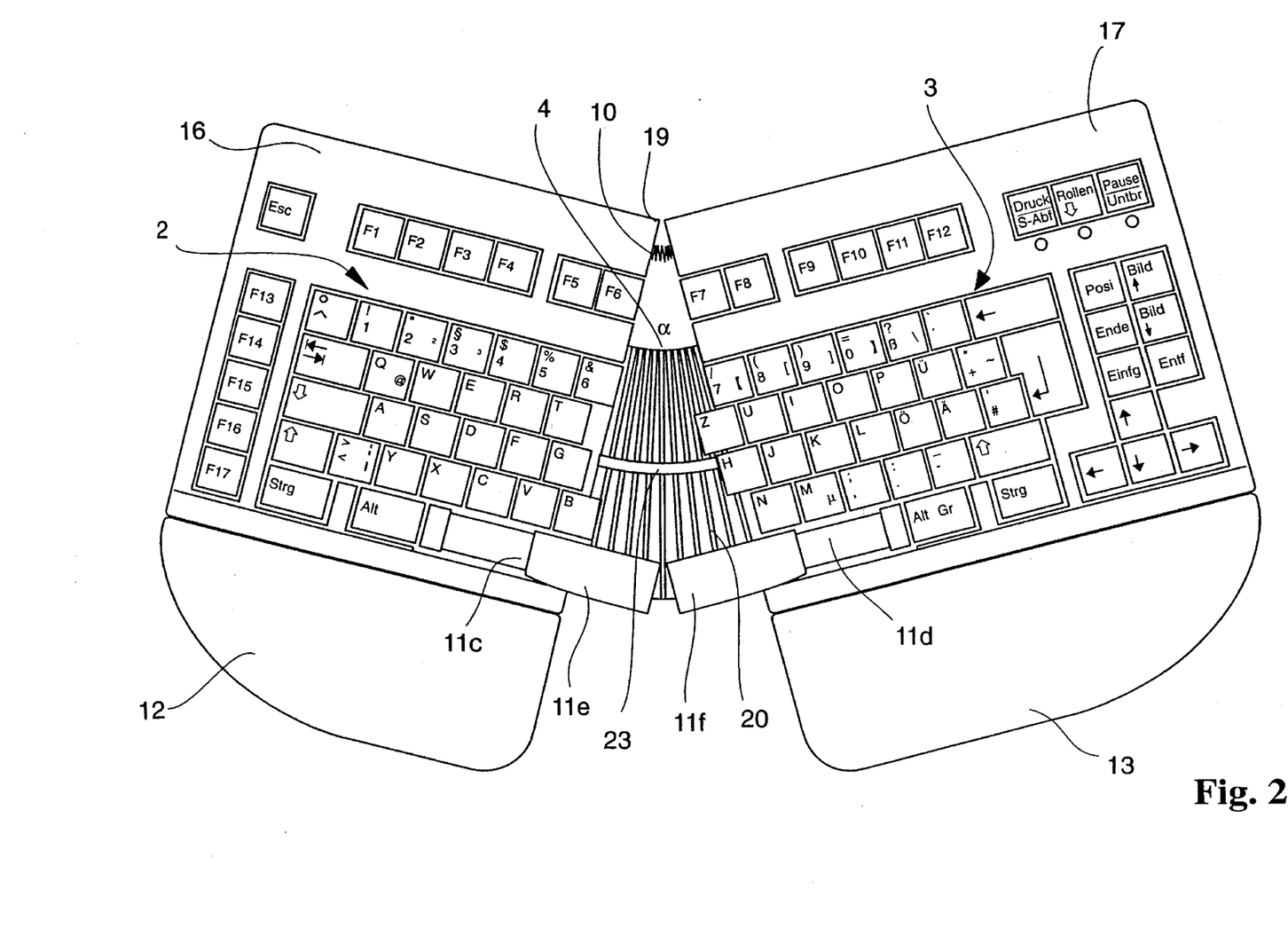
FIG. 2 is a top view of the keyboard of FIG. 1 wherein the two keyboard sections are in their pivoted positions.

FIG. 2 shows the ergonomic keyboard of FIG. 1 pivoted outwardly, whereby the left hand and the right hand keyboard housing sections 16, 17, including the associated hand rests 12 and 13, are pivoted outwardly about a pivot point 19 disposed in the separation plane 15 near a coil spring 10 extending between the keyboard housing sections 16, 17. In this position there is formed between the keyboard housing sections 16 and 17 an essentially wedge-shaped gap with an opening angle α which exposes the indexing plate 4 disposed at the bottom of the keyboard.

The two halves of the divided spacing bar each consist of two parts: a stationary part 11c and 11d mounted firmly on the respective housing section and a part 11e and 11f slidably supported on the stationary part 11c and 11d, respectively. When the two keyboard section are pivoted apart, the slidable parts 11e and 11f can be moved outwardly toward each other such that they bridge the gap between the keyboard sections. As a result of the angled arrangement of the two keyboard sections, the left hand and the right hand key pads 2 and 3, respectively, are oriented toward the left and right hands of an operator with his arms in a relaxed position which provides for ergonomically advantageous working conditions.

Figure 3:
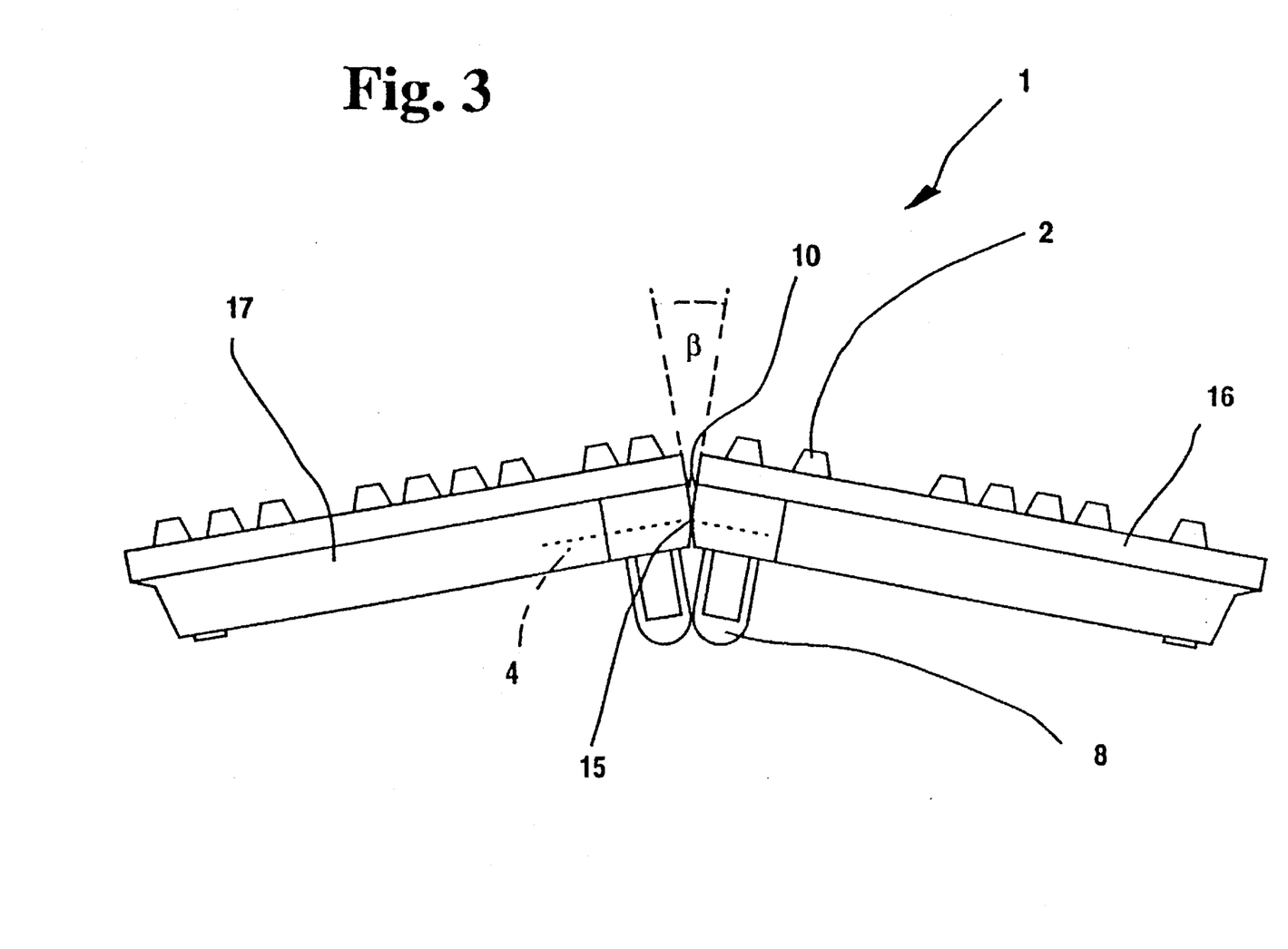
FIG. 3 is a view from the back of a second embodiment of the ergonomic keyboard with downwardly flipped support legs arranged on the bottom adjacent to the separation plane between the keyboard sections which therefore are tilted with respect to each other.

FIG. 3 is a view from the back of an ergonomic keyboard according to the invention wherein both keyboard housing sections 16 and 17 have the same size. The two sections are tilted with respect to each other in the separation plane 15 by an angle β. In order to raise the housing sections 16, 17 in the separation plane 15, support legs 8 mounted on the underside of the housing sections are flipped down to support the keyboard. In this embodiment, a spiral tension spring 10 is disposed within the housing sections and extends across the separation plane 15. Its opposite ends are attached to the housing sections 16, 17 to hold them together in cooperation with the indexing plate 4 disposed within the housing sections and indicated by a dashed line.

As a result of the pivotable arrangement explained in connection with FIG. 2 and the tiltability of the keyboard sections, the keyboard sections can be set up in a multitude of configurations adjusted individually to the needs of a particular operator.

Figure 4:
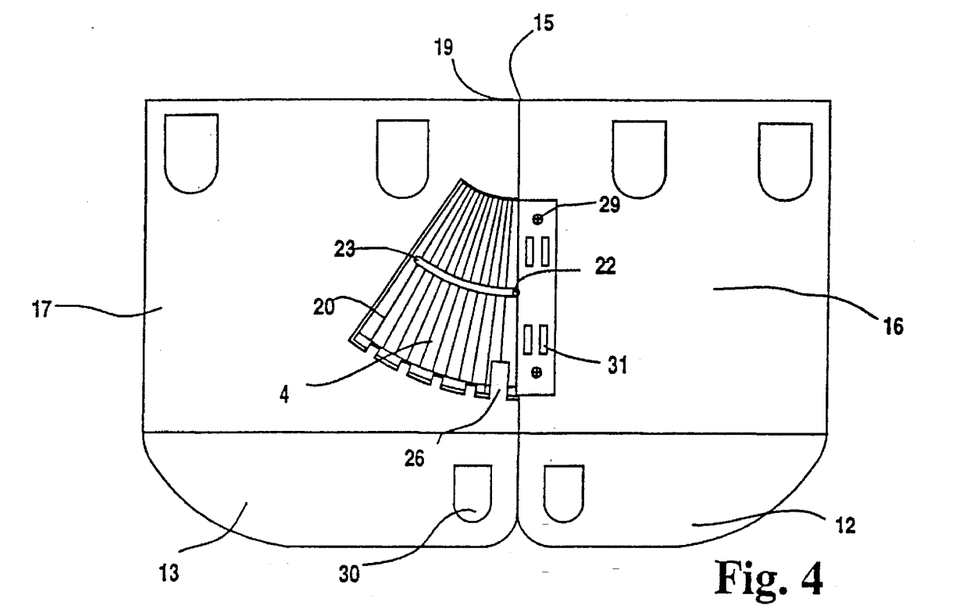
FIG. 4 is a bottom view of the ergonomic keyboard of FIG. 1.
Figure 5:
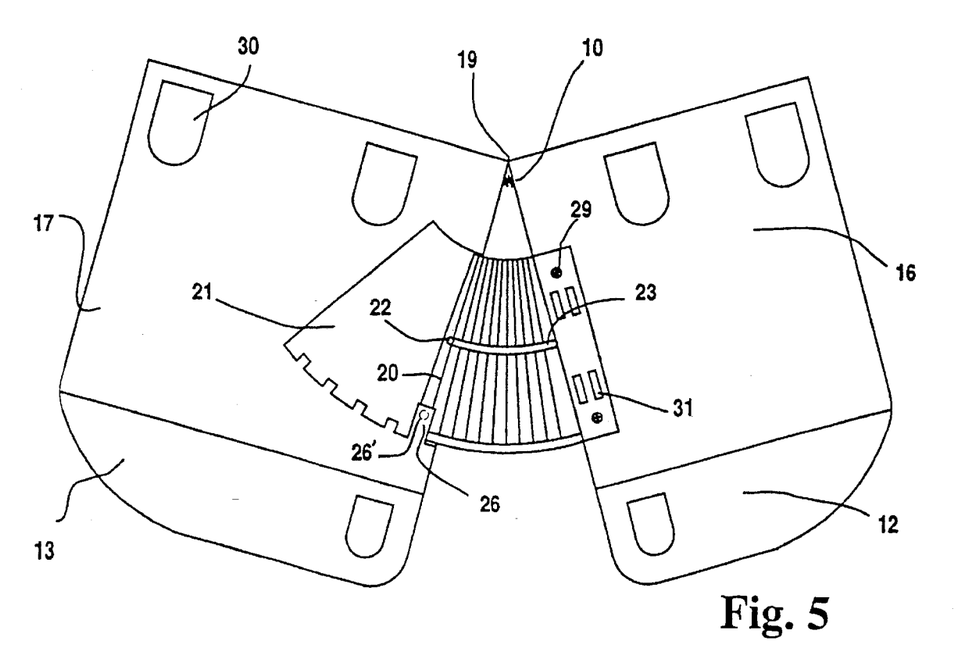
FIG. 5 is a bottom view of the ergonomic keyboard of FIG. 2.

FIGS. 4 and 5 are bottom views of the embodiment of FIGS. 1 and 2 where the ergonomic keyboard according to the invention is shown in a closed and a pivoted-apart position in which the two housing sections 16, 17 are separated along the separation plane 15 by a wedge shaped gap. In the drawings, coverplates mounted on the bottom of the housing sections are removed so that the indexing plate 4 is clearly visible. Also, the pivotable legs normally disposed in the recesses 30 are not shown in the bottom views.

Figure 6:
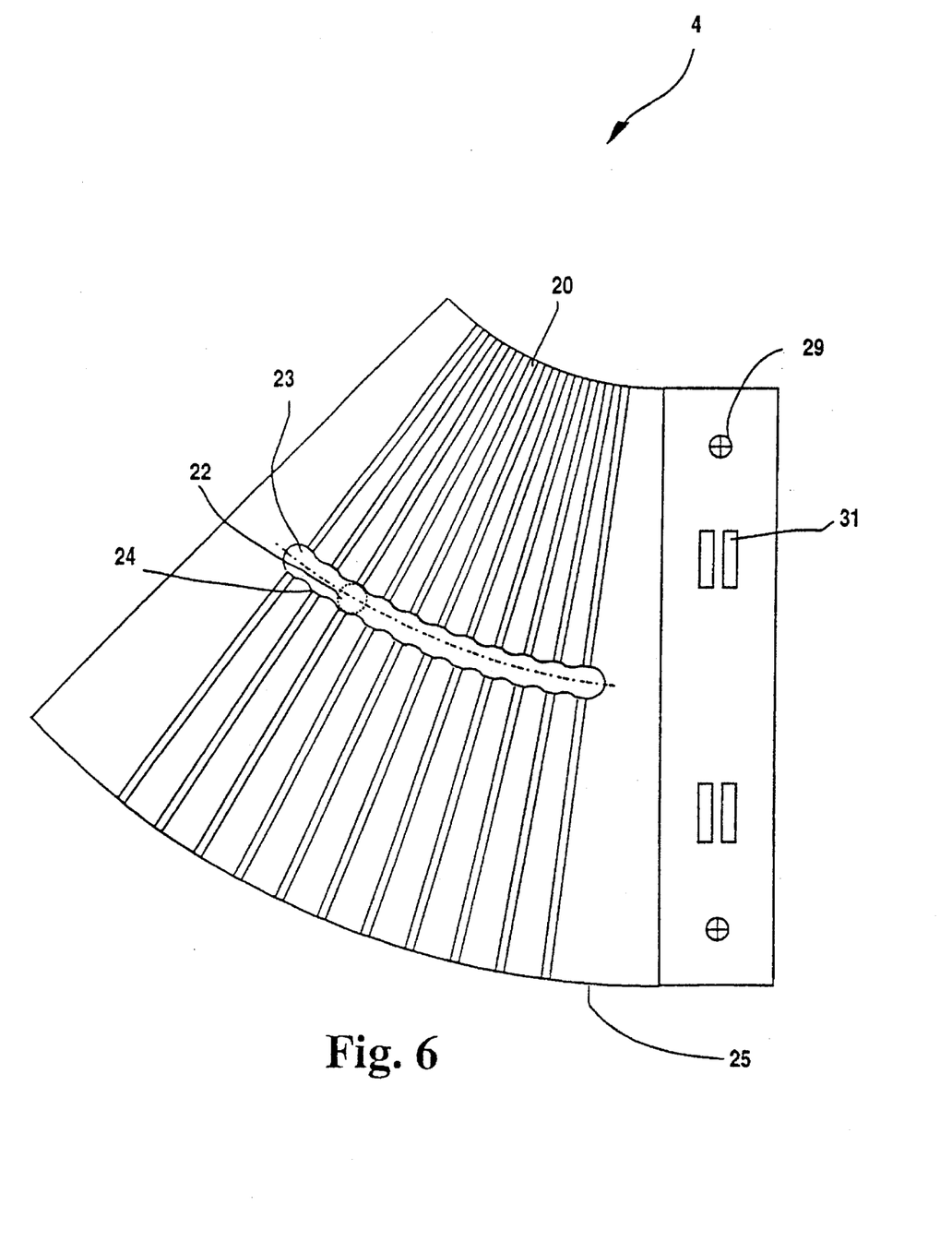
FIG. 6 shows the indexing plate used with the ergonomic keyboard according to the invention including the guide pin engaged therein.

FIG. 6 is an enlarged representation of the indexing plate 4 which is partially circular in shape as indicated by numeral 25 and consists of a flexible material which however is sufficiently rigid to bridge the space between the housing sections and lock the housing sections in any desired relative position. It may be, for example, a thin plastic plate provided with radial grooves 20 which provide for reduced thickness areas to facilitate bending of the indexing plate 4 along the groove 20. The indexing plate 4 is so oriented that the extensions of the radial grooves 20 intersect in a pivot point 19 disposed in the separation plane 15 near the coil spring 10. At one side, the indexing plate is firmly mounted to one of the housing sections by means of locking structures received in circular or rectangular openings 29, 31 (see FIGS. 4, 5). The other housing section has a circular sector-shaped recess 21 adapted to receive the other end of the indexing plate 4 when the two housing sections are pivoted together (as shown in FIGS. 4, 5 at left). Within the circular sector recess, there is a locking pin 22 which is engaged in a partial circular guide slot 23 formed in the indexing plate with a curvature centered at the pivot point 19. If the two housing sections are pivoted relative to each other about the pivot point 19 the locking pin moves through the guide slot 23. The width of the guide slot 23 varies along the circumferential length of the indexing plate 4 so as to provide alternately wider areas in which the locking pin 22 can easily slide through the guide slot 23 and narrower areas in which the locking pin is engaged within the guide slot 23 providing indexed positions 24. In this manner, the pivot angle α between the two wedge-like pivoted housing sections 16, 17 can be fixed. The use of such a indexing plate allows to provide multiple indexing positions 24 so that fine adjustment of the angle α is possible whereby each operator can individually select the most comfortable pivot position of the two housing sections 16, 17. In addition to being held together by the indexing plate 4 and the locking pin 22, the two housing sections 16, 17 are also engaged by the coil spring 10 which is preferably a tension spring which adjusts to the pivot movement of the two housing sections. In addition to the locking pin 22 being slidable in the guide slot 23, locking tabs 26 may be provided at the circular sector recess 21 in the housing section 17 and have projections 26' adapted to be received in the grooves 20 of the locking plate for additional fixing of the housing sections relative to each other.

The indexing plate 4 consists of a flexible material and the position of the locking pin 22 and the indexing positions 24 in the guide slot, as well as the radial slots 20, are so arranged with respect to each other that, when the locking pin 22 rests in an indexing position 24, there is always one of the grooves 20 essentially in the dividing plane 15. With this arrangement, it is always possible to tilt the two housing sections 16, 17 in the dividing plane no matter which pivot position the two housing sections are in. The tension spring 10 and the flexible indexing plate 4 adjust to such tilting in an indexing position 24 so that combined pivoting and tilting movements can also be executed.

Figure 7:
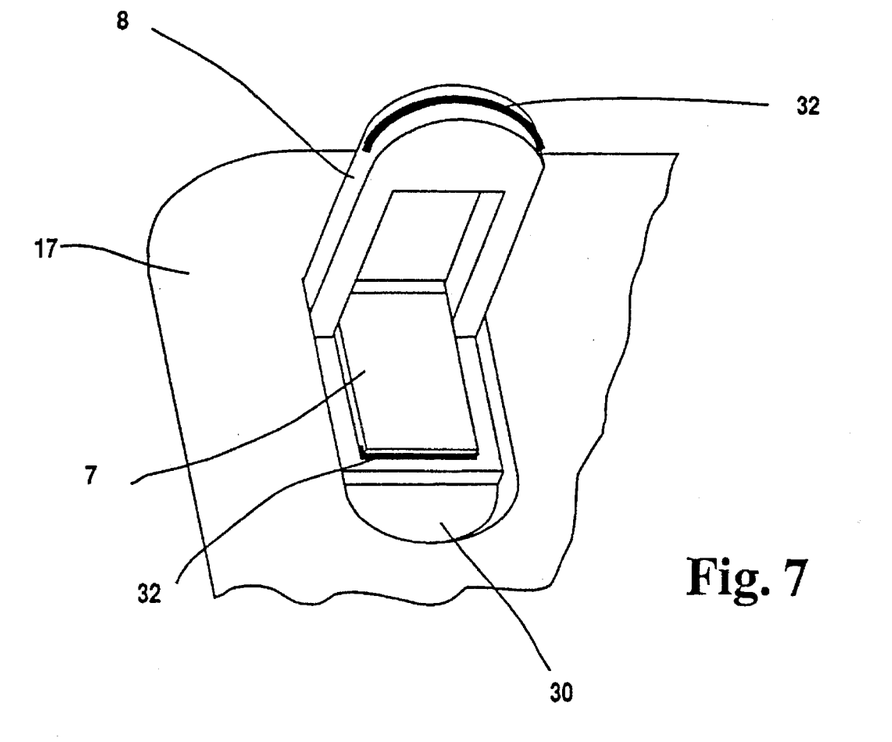
FIG. 7 shows a pivotable support leg for the keyboard.

Two groups of differently sized pivotable legs 7, 8 mounted on the bottom of the housing sections as shown in FIG. 7 provide support for the tilted housing sections 16, 17. A first group of relatively small legs 7 of essentially rectangular shape is pivotally disposed in recesses formed in the underside of the housing sections 16, 17. Some or all of the relatively small pivotable legs 7 are surrounded by larger pivotable legs 8 which have essentially a U-shape and are pivotally supported by the same bearing structure as the respective smaller pivotable legs 7 such that they are pivotable around the smaller legs 7. FIG. 7 shows the larger U-shaped leg 8 pivoted fully out of the recess 30 and the smaller leg 7 pivoted fully into the recess 30. Both groups of pivotable legs are provided with skid-resistant beads 32 which may be received in grooves formed in the legs and both together can be tilted into the recess 30 in the underside of the housing sections such that, when pivoted into the recess 30, they do not project from the bottom of the keyboard sections. The supports for the housing legs are preferably so formed that the legs can be arrested in their fully inward and outward pivoted end positions.

As a result of the different combinations of positions for the various legs 7, 8 disposed in the recesses 30 on the underside of the keyboard sections 16, 17 and the possibility of selecting the smaller or larger legs, multiple tilt positions of the two housing sections can be selected with which the pivotable legs 7, 8 support the keyboard in a stable manner. It is also possible to support the keyboard so that it is higher in the back than in the front (near the operator) or, vice versa, so that it is higher in the front than in the back with any pivot position of the keyboard sections relative to each other. The sections may also be tilted so that the keyboard is higher in the center and lower toward at the outside, or vice versa, so that it is higher at the outer ends and the lower in the center. This ensures that each operator can adjust the keyboard I to his or her individual preference and can then stabilize the keyboard in this position (tilting angle β and pivot angle α).

If the thickness of the skid resistant beads 32 is suitably selected with regard to the size of the pivotable legs 7, 8, it is possible for all the legs to maintain contact with a support base for any selected keyboard arrangement so that, for any possible tilt or pivot configuration, skidding of the keyboard legs 7, 8 on the support surface is prevented and good support stability of the keyboard is provided for in any tilt and pivot configuration.

Figure 8:
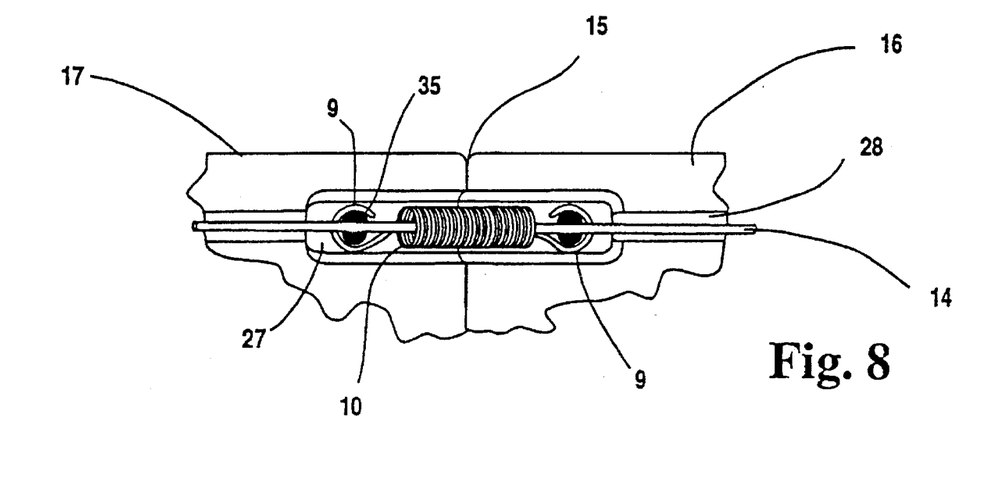
FIG. 8 shows a tension spring arranged between the keyboards to form a pivot joint with the electrical connecting cable extending through the spring.

As shown in FIG. 8, a tension spring 10, which extends between the adjacent housing sections, interconnects the two housing sections 16, 17 and also receives a cable 14 which may include the electrical power cord. This provides for an elegant solution for the protection of the cable in the open edge area between the two keyboard sections 16, 17 when compared with other arrangements such as a ball joints.

FIG. 8 shows the tension spring 10 with eye shaped hooks 9 engaged by anchoring elements 35 disposed in a recess 27 and the cable 14 disposed in a cable groove 28 formed in the bottom of the housing sections 16, 17. The spring 10 however could also be arranged fully within the housing sections 16, 17 so that it would not be visible from underneath.

Figure 9A:
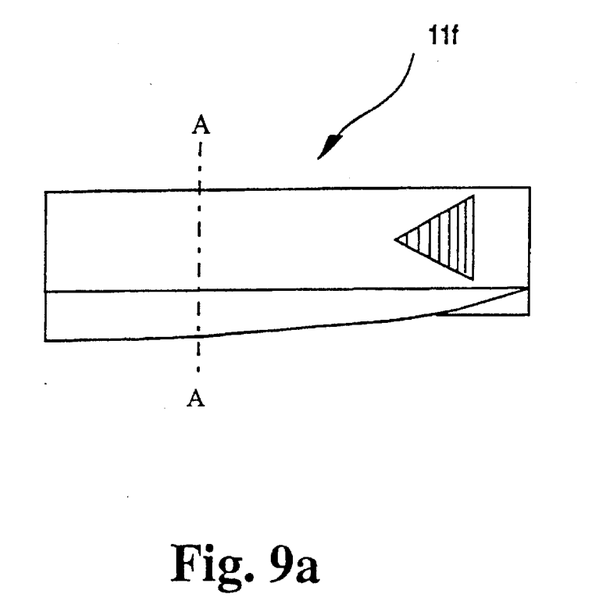
FIGS. 9a and 9b show a slidable portion of a spacing bar.
Figure 9B:
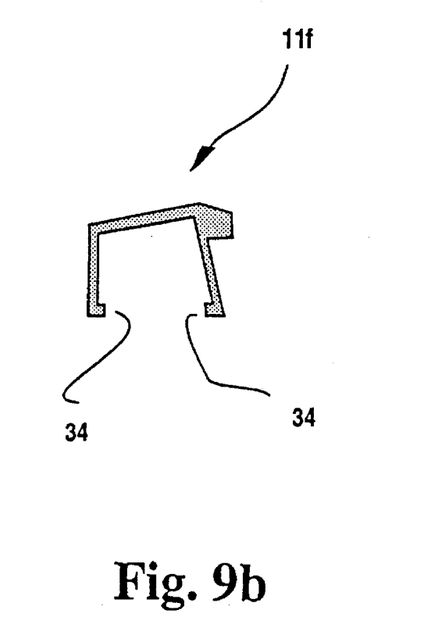
Figure 10:
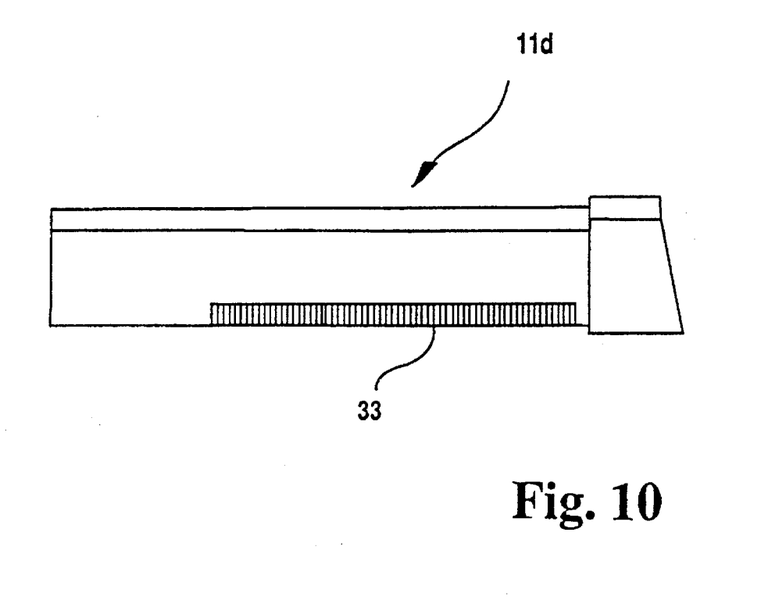
FIG. 10 shows the stationary spacing bar portion on which the slidable spacing bar portion of FIGS. 9a and 9b is disposed.

As already mentioned in connection with FIG. 2, in the keyboard according to the invention, the spacing bar is the only key which is assigned to two key pads 2,3 and which is divided along the separation plane 15 into a left hand part 11a and a right hand part 11b when the adjacent housing sections 16, 17 are pivoted apart. Each of these spacing bar parts 11a, 11b comprises a stationary spacing bar section 11c and 11d, respectively, which is mounted on the respective housing section 16 or 17 and a spacing bar slide member 11e and 11f, respectively, which is slidably supported on the respective stationary spacing bar portion. FIG. 9a shows a spacing bar slide member 11f which is slidably mounted on the stationary spacing bar portion 11d, shown in FIG. 10. As shown, this stationary spacing bar portion 11 is provided with indexing grooves 33 adapted to receive corresponding indexing webs 34 of the slidable spacing bar member 11f as shown in FIG. 9b, which is a cross-sectional view taken along line A—A of FIG. 9a. When the housing sections 16 and 17 are pivoted apart the spacing bar slide members 11e and 11f can be moved inwardly toward each other in a stepwise fashion from indexed position to indexed position, thereby bridging the center gap where the thumb will normally engage the spacing bar. When the two housing sections are again pivoted together, the spacing bar slide members are automatically pushed back over the respective stationary spacing bar positions 11c and 11d respectively.

It is pointed out however that the present invention is not limited to an arrangement with two housing sections; also other housing sections such as special function key or numeric key pad sections may be attached on the side of the keyboard in a similar manner.

What is claimed is:

1. An ergonomic keyboard comprising at least two housing sections each with a key pad for one hand of a keyboard operator, said two housing sections being interconnected by a joint permitting pivoting and also tilting of the two housing sections relative to each other with respect to a dividing plane, said joint comprising a coil spring extending between said housing sections and having opposite ends, one connected to one and the other to the other of said housing section at a location remote from the keyboard operator so as to form a universal joint between the two housing sections, an essentially circular sector-shaped indexing plate bridging said housing sections and having one end firmly mounted to one of said housing sections and the other end movably received in the other of said keyboard sections, said indexing plate having a partial circular guide slot, a guide pin mounted on the other of said housing sections and extending into said guide slot, said two housing sections being pivotable relative to each other about a pivot point formed at the center of curvature of said guide slot at the joint of said two housing sections by said coil spring.

2. A keyboard according to claim 1, wherein first and second groups of legs are pivotably mounted on the bottom of each housing section, the first group of relatively small legs mounted to a housing section by a bearing structure which permits pivoting of said relatively small legs and at least some of said smaller legs are surrounded by U-shaped larger legs which are also pivotably mounted on the same bearing structures as the relatively small legs which they surround and which form said second group of legs, each of said groups smaller and larger legs being independently pivotable between fully outwardly extended and fully retracted end positions.

3. A keyboard according to claim 2, wherein said legs are supported in recesses formed in the underside of said housing and pivotally so mounted that they can be tilted into and out of said recesses and supports are provided for said legs which are formed such that the legs can be arrested in their fully extended and their fully retracted positions.

4. A keyboard according to claim 2, wherein said pivotable legs are provided at their support end faces with beads of a skid resistant material which project from the leg end faces such that, for all the tilt and pivot configurations of the two housing sections, the skid resistant beads will always engage a level support surface on which said keyboard rests.

5. A keyboard according to claim 1, wherein a handrest is removably attached to each of said two keyboard housing sections at their ends adjacent the operator.

6. A keyboard according to claim 5, wherein also said handrests are provided with pivotable legs.

7. A keyboard according to claim 1, wherein said indexing plate includes angularly spaced, radial grooves to facilitate flexing of said indexing plate.

8. A keyboard according to claim 7, wherein a lacking tab is provided at the bottom of the other of the housing sections and includes a projection adapted to be engaged in said grooves.

9. A keyboard according to claim 1, wherein a cable extending between said two keyboard housing sections is received within said coil spring.

10. A keyboard according to claim 1, wherein each of said housing sections includes a spacing bar part, each comprising a portion firmly mounted on the respective housing section and a spacing bar slide member slidably supported on said firmly mounted portion, each of said firmly mounted portions having indexing grooves and slide members having indexing webs adapted to be engaged by said indexing grooves for retaining said slide members in any desired slide out position for bridging the space formed between said housing sections when they are pivoted apart from each other.

11. A keyboard according to claim 1, wherein said coil spring is a tension spring disposed in recesses formed in said housing sections at opposite ends of said tension spring.

12. A keyboard according to claim 1, wherein the guide slots in said indexing plate are provided with spaced, widened portions providing rest positions for said locking pin.

* * * * *